Jan. 13, 1959     K. W. HALL     2,867,844
PRESS FOR MOLDING POWDERED MATERIAL
Filed Jan. 18, 1954     10 Sheets-Sheet 1

FIG. 1

INVENTOR.
KEITH W. HALL
BY
ATTORNEY

INVENTOR.
KEITH W. HALL
ATTORNEY

FIG. 8

INVENTOR.
KEITH W. HALL
BY
ATTORNEY

FIG. 13

Jan. 13, 1959 K. W. HALL 2,867,844
PRESS FOR MOLDING POWDERED MATERIAL
Filed Jan. 18, 1954 10 Sheets-Sheet 10

FIG. 14

INVENTOR.
KEITH W. HALL
BY
ATTORNEY

United States Patent Office 2,867,844
Patented Jan. 13, 1959

2,867,844

PRESS FOR MOLDING POWDERED MATERIAL

Keith W. Hall, Ann Arbor, Mich., assignor to Baldwin-Lima-Hamilton Corporation, a corporation of Pennsylvania Application January 18, 1954, Serial No. 404,710

22 Claims. (Cl. 18—16.5)

This invention relates generally to presses for forming compacts of powdered material, especially powdered metals.

While a great many compacting presses have been proposed and used yet they have been deficient in many respects both functionally and structurally, particularly mechanically operated presses employing cranks and cams.

It is an object of my invention to provide in a press improved adjustable type cam and follower mechanism for the ejection stroke whereby the length of the ejection stroke may be varied while still maintaining complete operating contact between all elements of the ejection mechanism regardless of its length of stroke from zero to full range.

Another object is to provide an improved ejection mechanism employing a single set of cams without lost motion between the cams and their followers and in which two separate adjustments may be effectively made for the ejector punch, one adjustment for the bottom or fill position of the plunger and the other adjustment for the ejector stroke.

Still another object is to provide a counterbalanced floating die and means to adjustably limit its stroke.

A further object of my invention is to provide an improved arrangement of press operating elements whereby they effectively provide not only a large vertical central opening in the press but also allow crank shafts, operating gears and ejection cams to be employed with a balanced construction whereby the very great ejection and compression forces will not produce any disalignment of dies and punches thereby to insure reliable operation of the press.

A still further object is to provide an improved bottom punch support for facilitating and expediting insertion and removal of the bottom punch and core rod as a single unit.

Another object is to provide an improved floating core rod support whereby the core rod may float down against an adjustable stop to control the ultimate pressing position while another adjustment is adapted to control the height or fill position of the core rod whereby these two adjustments together may effectively control the density and measurement for tolerance of the part being compacted.

A further object is to provide means for feeding the powdered material to the die so that the bottom punch cooperates in the filling operation by producing a sucking action to insure rapid and complete filling of the die.

Another object is to provide improved means in association with the feeder mechanism for pushing off of the die top support surface compacted parts after they are ejected and more particularly to allow the feeder means to operate at a slower speed than is normally the case.

A still further object is to provide an improved type of crank shaft that is peculiarly adapted to a press of the type herein disclosed.

Other objects and advantages will be more apparent to those skilled in the art from the following description of the accompanying drawings in which.

Figure 1:
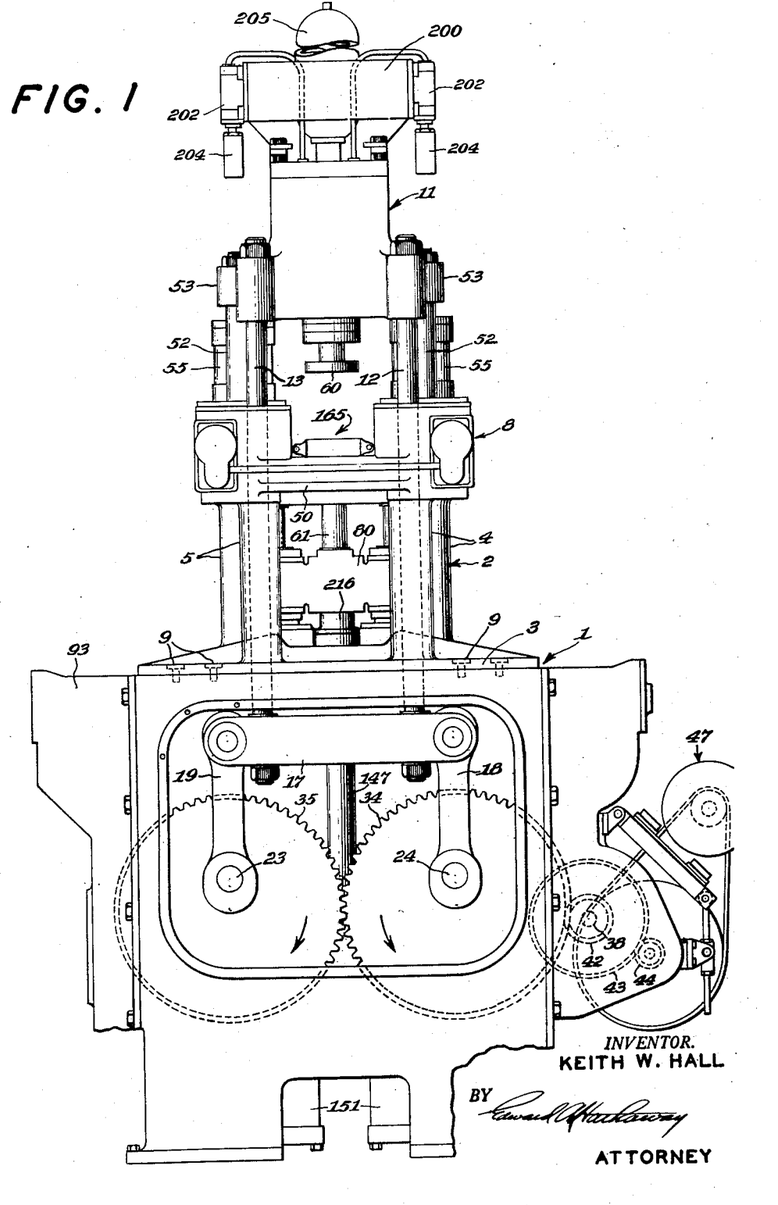
Fig. 1 is a front elevation of the press.
Figures 2, 3:
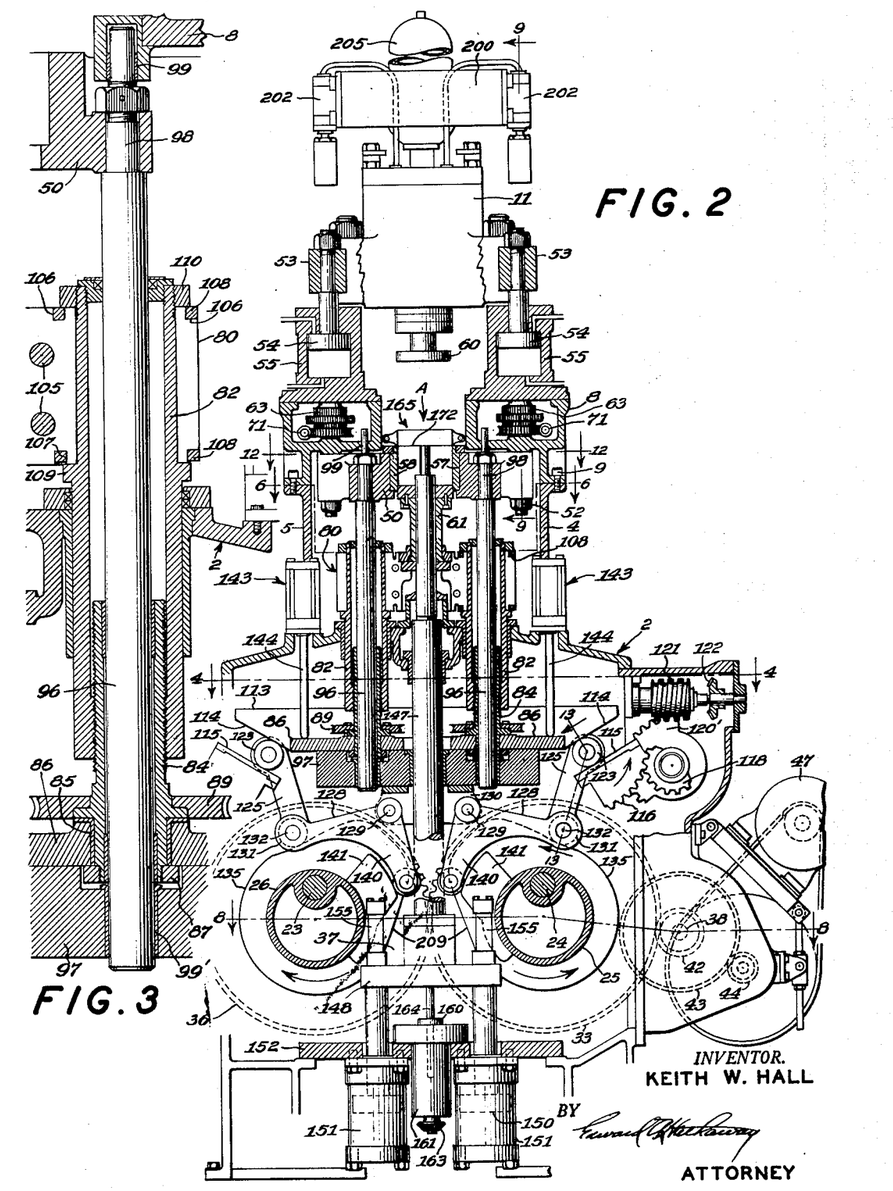
Fig. 2 is a partial vertical section taken generally on a plane 2—2 of Fig. 8, certain parts being shown in elevation or omitted for purposes of clarity.
Fig. 3 is a fragmentary portion of Fig. 2 enlarged to show details of construction of the guide for the floating die and ejector as well as other features.
Figure 6:
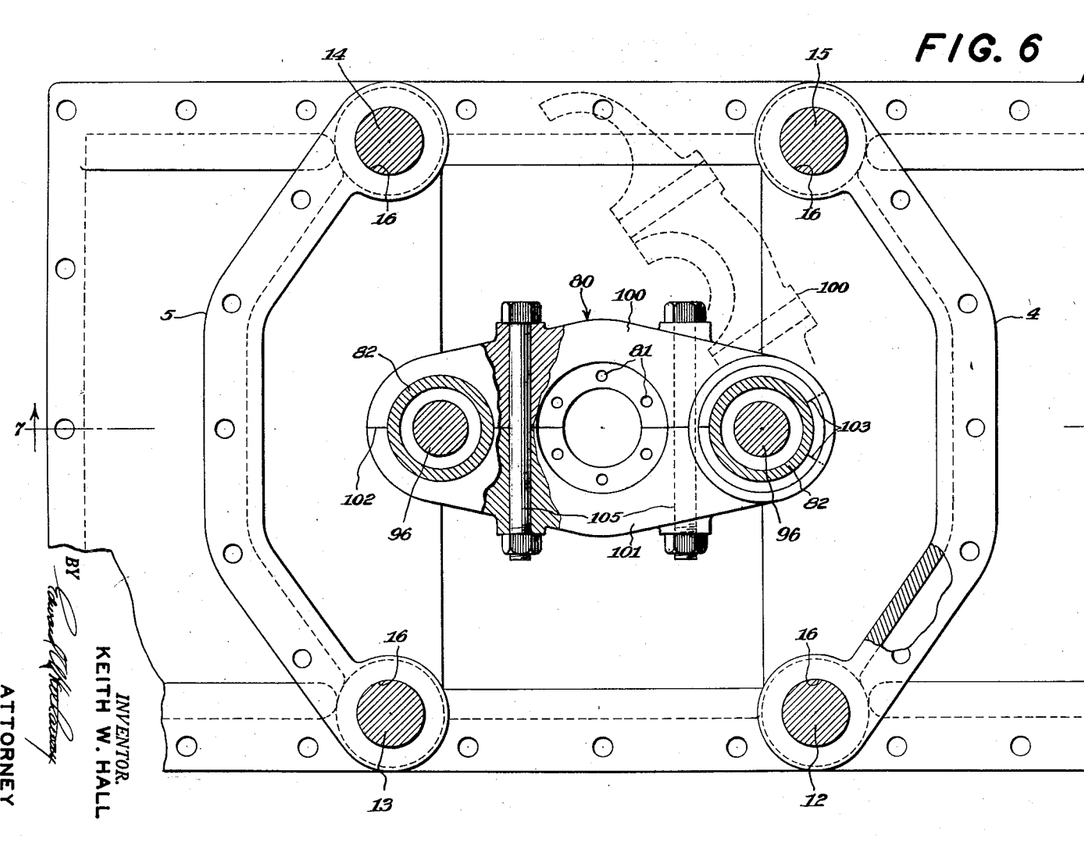
Fig. 6 is a horizontal section taken generally on line 6—6 of Figs. 2 and 7 showing the hinged bottom punch support with core rods and punch removed for clarity.

In the specific embodiment of my invention I have shown in Fig. 1 a lower housing or base generally indicated at 1 on which is mounted an upper housing 2 provided with a horizontal portion 3 from which two laterally spaced vertical standards 4 and 5 extend upwardly from opposite sides of the housing as shown in Fig. 6. Supported upon the upper end of standards 4 and 5, Fig. 2, is a stationary gear housing generally indicated at 8 for adjusting the amount of float of a floating die to be described later. The flanges of the various housings are securd together by usual tap bolts 9. Spaced above the housing 8 is a floating head generally indicated at 11. This floating head is secured to the upper ends of four vertically reciprocating tie rods 12, 13, 14 and 15, Figs. 1, 4 and 9, extending through suitable guide openings such as 16, Fig. 6, which are formed in the vertical standards 4 and 5, Fig. 1, the lower ends of the tie rods being connected to two vertically movable horizontally extending crosspieces 17, one at the front and one at the back of the press. This crosspiece in turn is connected, Figs. 1 and 8, by four connecting rods 18, 19, 20 and 21 to crank pins 23 and 24.

Figure 8:
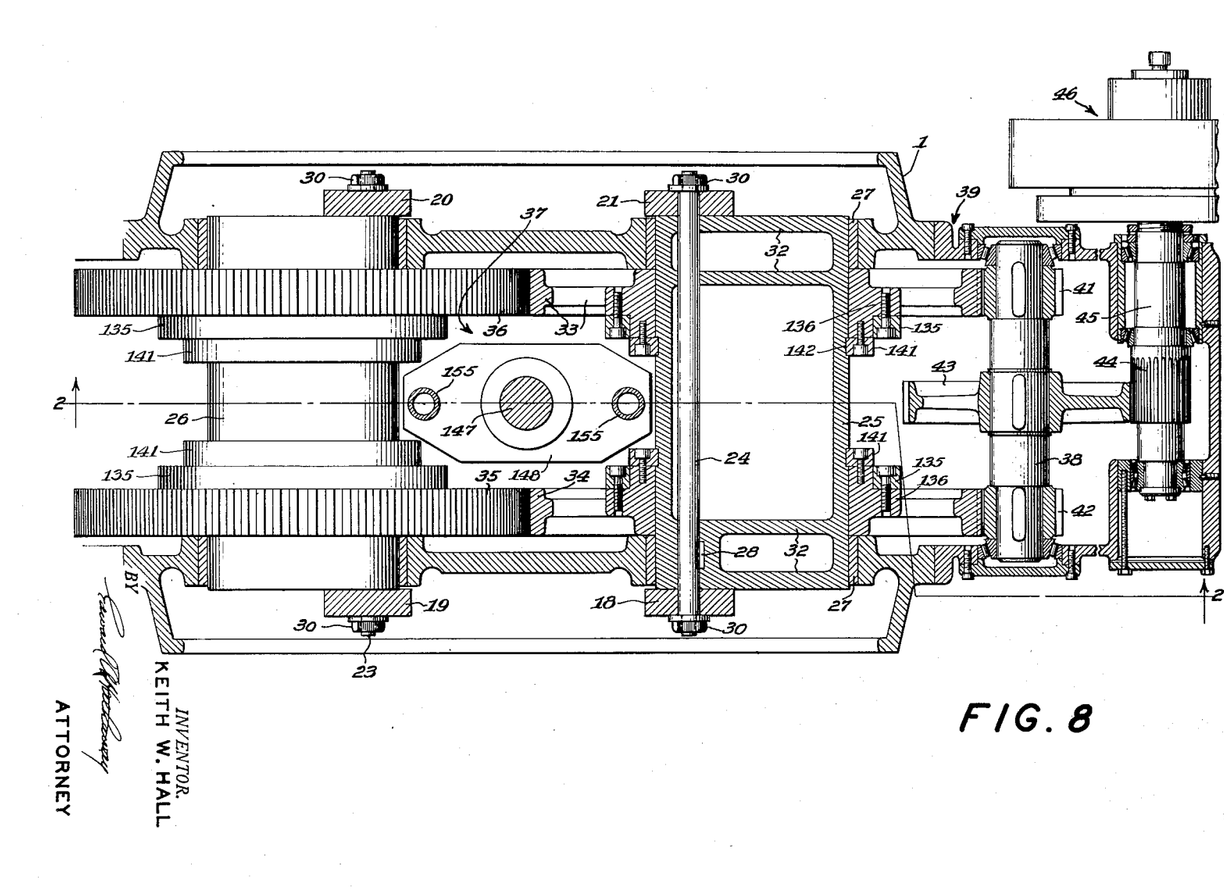
Fig. 8 is a horizontal section taken substantially on line 8—8 of Fig. 2 to show the relationship of driving gears, core rods, punches and ejector cams, certain parts being either omitted for clarity or shown partly in full and partly in section.

As shown in Fig. 8, the crank pins 23 and 24 each consist of a straight pin extending axially through transverse walls 32 of enlarged hollow shafts 25 and 26 and keyed thereto as at 28. Each end of these hollow shafts is journaled in bearings 27 formed in the walls of the lower housing 1. The pins are held in an axial position by washers and cap screws 30 secured to the ends of the crank pins. This shaft and crank pin arrangement provides not only an extremely rugged crank shaft with minimum torsional deflection but at the same time the crank pin itself by being cylindrical throughout its length may be easily machined and hardened without subjecting the enlarged shafts to such hardening operation. The enlarged shafts may be cast and they also may be easily machined by reason of their outer surfaces being cylindrical. Because their diameter is large relative to their length, as shown in Figs. 2 and 8, the shafts are herein referred to as "barrel" types.

The arrangement of the four connecting rods at the ends of the shafts 25 and 26 insures uniform support and reciprocation of the crosspieces 17. The shaft 25 is provided with operating gears 33 and 34, Figs. 1, 2, and 8 meshing with identical size gears 35 and 36 on shaft 26. The two parallel shafts by being spaced apart horizontally in one direction and the gears on each shaft axially spaced apart in the other direction, preferably substantially equal distances from the vertical axis of the punches, not only provide an effective basis for equally supporting the crosspieces 17 but additionally provide a vertically free central space 37 between the gears and shafts, the functional advantage of which will be seen later in connection with other operating mechanisms. To drive the operating gears an intermediate shaft 38 is suitably journaled in a drive housing generally indicated at 39 which is bolted to the side of the lower housing 1. Shaft 38 is provided with pinion gears 41 and 42 and with an intermediate gear 43, the latter in turn being driven by a pinion gear 44 formed preferably integrally with a shaft 45. This driving pinion shaft is suitably journaled in an extension of drive housing 39 and is provided at one end with a flywheel which contains any conventional clutch and brake, generally indicated at 46. The flywheel is driven in any suitable manner such as by a belt and motor generally indicated at 47, Fig. 1. To increase the capacity of the press a duplicate set of driving gears may be used directly on the gears 35 and 36 thereby relieving the teeth of gears 33 and 36 at the point of their meshing from the transmission of power although such meshing will function for timing purposes.

Adjustable floating die platen

Figure 9:
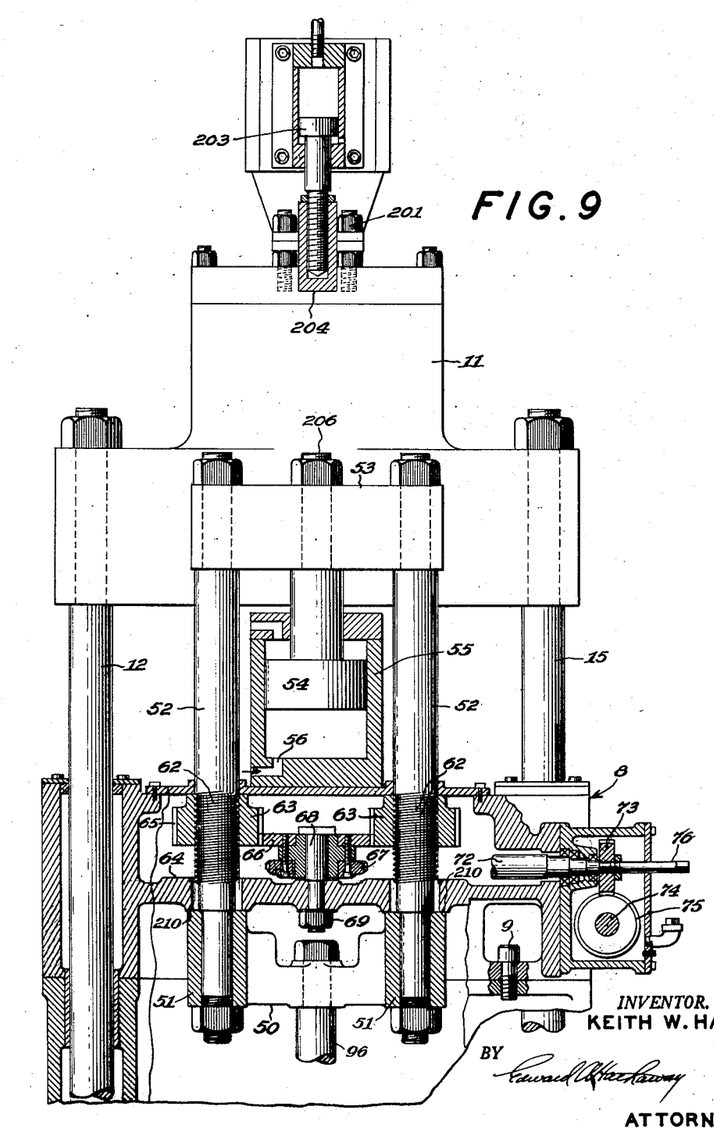
Fig. 9 is a vertical section of one side of the press taken substantially on line 9—9 of Fig. 2 with certain parts omitted for clarity.
Figure 12:
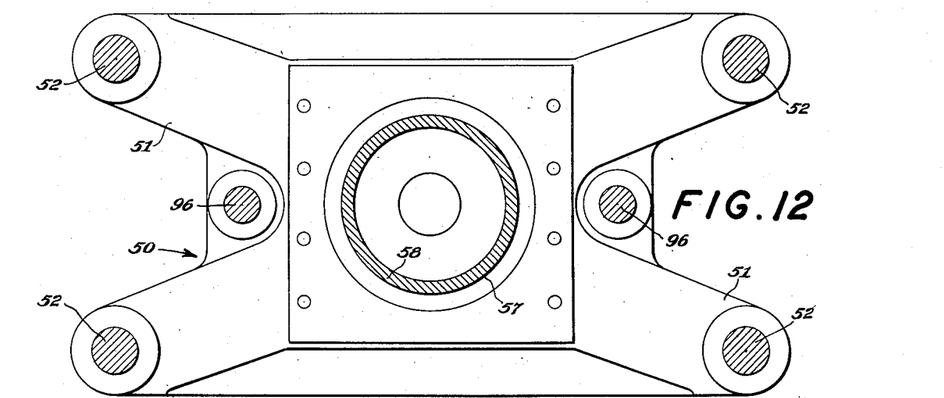
Fig. 12 is a plan view of the floating die platen taken substantially on line 12—12 of Figs. 2 and 7 with certain parts and details of construction omitted for clarity.

The press is provided with a die platen 50, Figs. 2, 9 and 12, having as shown in Fig. 12 four arms 51, one pair toward each side of the press. In these arms, two of which are shown in Fig. 9, the lower ends of four support columns 52 are secured while the upper ends thereof are secured in two crossheads 53 located respectively on opposite sides of the press, Fig. 1. The crossheads are connected to pistons 54, Figs. 2 and 9, of die float cylinders 55 mounted respectively on each side of the press upon the top of the stationary gear housing 8. The pistons 54 of the die float cylinders are normally biased upwardly by fluid pressure admitted through passages 56 from any suitable source of constant pressure while the upper ends of the cylinders are open to atmosphere. The die platen 50, as shown in Figs. 2 and 12, is provided with a usual vertical die opening 57 to receive a die 58 whose cavity may be of any desired internal configuration.

As shown in Fig. 2, upper and lower punches 60 and 61, respectively, and core rods to be described later, cooperate with the die to compact powdered material therein. During this compaction the die floats downwardly against the constant pressure in float cylinders 55 and in order to adjust the extent of this downward movement all four of the support columns 52, Fig 9, have threads 62 with limit nuts 63 thereon adapted to engage the lower surface 64 of the gear housing thereby limiting the downward motion of the die platen. The adjusting mechanism for each pair of these nuts, one pair at each side of the press, are identical and hence only one pair need be described. Gear teeth 65 are formed on the periphery of the nuts and mesh with a common central gear 66 which in turn is bolted to a worm gear 67 to form a unit which is journaled upon a shaft 68. This shaft is secured by a stud and nut 69 in the bottom of gear housing 8. As shown in Fig. 2, a worm 71 is suitably journaled in the gear housing and meshes with worm gear 67, the worm being secured to a shaft 72, Fig. 9, whose outer end is provided with a gear 73. The corresponding gearing and limit nuts at the other side of the press are cross-connected by a shaft 74 and gears 75 meshing with the gear 73 on each side of the press. The gears 73 and 75 are preferably of the helical type which permits the shaft 72 on one side of the press to be extended as at 76, Fig. 9, to receive a hand crank, not shown, whereby rotation of shaft 76 effects rotation of the cross shaft 74 together with the limit nut stops 63 for all four die support columns.

The upper punch 60, Figs. 1 and 2, is supported within the floating head 11 whose construction and operation are identical to that of Fig. 2 of Saari Patent No. 2,572,953 except that a hydro-pneumatic accumulator 205 is employed in place of an intensifier of said patent to supply constant pressure fluid to the floating head. The purpose of such floating head is to maintain a predetermined and uniform applied force to the material of a compacted article within certain variations of the fill within the die cavity.

Lower punch support

Figure 4:
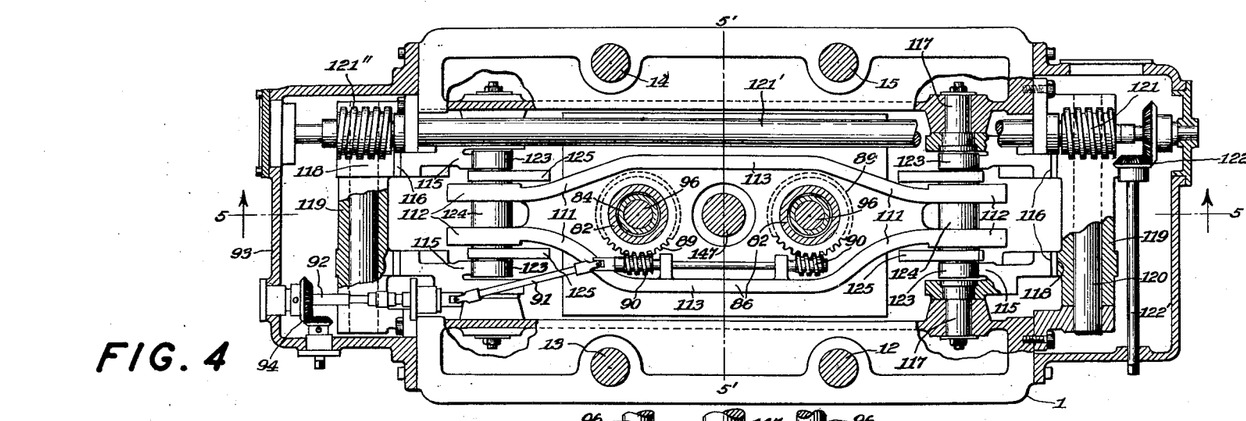
Fig. 4 is a horizontal section taken generally on line 4—4 of Fig. 2 showing the depth of fill adjusting means and the ejection base plate assembly in plan view with its stroke adjusting means.
Figure 7:
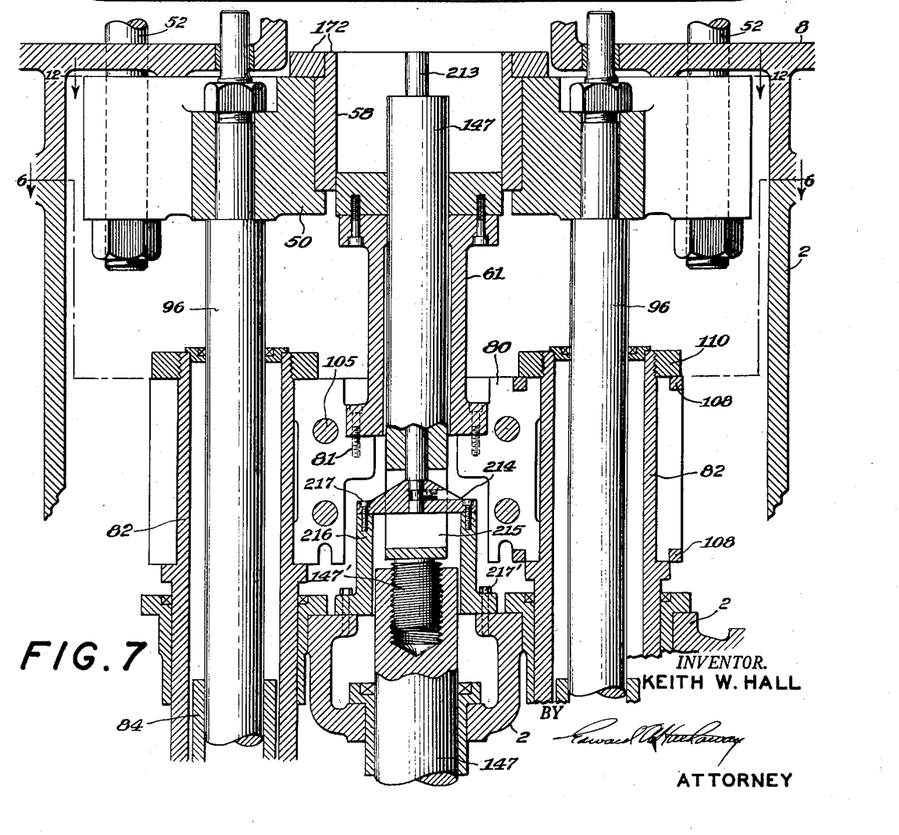
Fig. 7 is a vertical section taken generally on line 7—7 of Fig. 6 showing a stationary core rod support and a floating core rod.

To support the lower punch 61 its lower end is mounted on the top of a crosshead generally indicated at 80, Figs. 2, 6 and 7, and is removably secured thereto by studs 81. The cross head 80 is generally of elongated form in plan view and its ends, one of which is shown in Fig. 3, are supported upon a pair of vertical sleeves 82. These sleeves extend downwardly and their lower ends are provided with internal threads to receive externally threaded screw sleeves 84 which are journaled in bearings 85 in an ejection base plate 86. The lowermost end of the screw sleeves 84 are provided with nuts 87 to prevent upward displacement of the sleeve from plate 86. To rotatably adjust screws 84 and therefore raise or lower sleeves 82 worm wheels 89 are secured to the lower end of each screw 84. As shown in Fig. 4, the worm wheels on each of the screws are simultaneously rotatable by the provision of a pair of worms 90 suitably journaled on ejection base plate 86 and connected together by a common shaft. This shaft is connected by a universally jointed shaft section 91 to a shaft 92 journaled in a fixed position in a bearing box 93. A pair of beveled gears 94 permit adjustment of shaft 92 from the front of the press. To guide the sleeves 82 and 84, Fig. 3, a rod such as 96 is slidably supported at its lower end in a bearing 99' of a stationary cross member 97 of the lower base housing 1 while the upper end 98 of the rod is secured to the die platen 50 and is vertically guided in a bearing 99 formed in the gear housing 8.

The punch support crosshead 80 is so constructed and arranged as to insure maximum ease of accessibility to the lower punch and core rods thereby to expedite the removal and insertion of punches, core rods, and adapters. To this end the punch support, as shown in Fig. 6, is formed in two halves 100 and 101 split along a central vertical plane and normally firmly held together and clamped to the sleeves 82 by bolts 105. Upon removal of these bolts one portion of the punch support is swung open to the dotted line position around one of the sleeves as an axis or, if desired, both portions may be partially swung open to allow the punch to be moved down clear of the die and then removed laterally together with the core rods. To support the pivotal end of the two halves they are provided with upper and lower annular grooves 106 and 107, Fig. 3, in which closed keeper rings 108 are placed during assembly prior to the punch support being mounted on one of the sleeves 82. A collar 109 formed on sleeve 82 and a nut 110 hold the punch support in its vertical position. A similar collar 109 is formed on the other sleeve to support the left end of the punch support in its closed position. It is not necessary to use rings such as 108 on the left end inasmuch as the bolts 105 are sufficient to hold the two halves of the punch support on the sleeves 82. When the two halves of the punch support are clamped together, punch 61 may then be secured in position as shown in Fig. 7 by the vertical studs 81 threaded in each of the two halves 100 and 101. Inasmuch as such studs are secured in both halves it is necessary to remove them before the punch support can be separated. To permit swinging of the two halves, the pivotal end thereof has its outer vertical surfaces 103, Fig. 6, formed to provide a V-space which closes during swinging. The vertical surfaces 102 at the other end of the halves are parallel to each other when closed, this being possible because such surfaces open away from each other.

*Ejection plate and operating means*

In order for the lower punch 61 to perform an ejection action after an article has been compacted, operating means, Fig. 2, are provided for raising the ejection base plate 86 and thereby raising sleeves 84 and 82 together with punch support 80 which carries with it the punch 61.

The horizontally elongated plate 86 has a pair of side walls 113 (see also Fig. 4) whose ends extend inwardly at 111 toward each other and then terminate in parallel portions 112 near the horizontal center line 5—5 of the press. The lower edges of the parallel portions 112 have upwardly inclined linear cam surfaces 114, Fig. 2, at a fixed angle relative to the plate, thus providing four such inclined surfaces, one in each quadrant of the press in plan view. The plate actuating mechanism now to be described is also duplicated in all four quadrants so that the mechanism is symmetrical about the two horizontal center lines, e. g. 5—5 and 5'—5', Fig. 4, at right angles to each other and hence the description for one quadrant will suffice for all.

Figure 13:
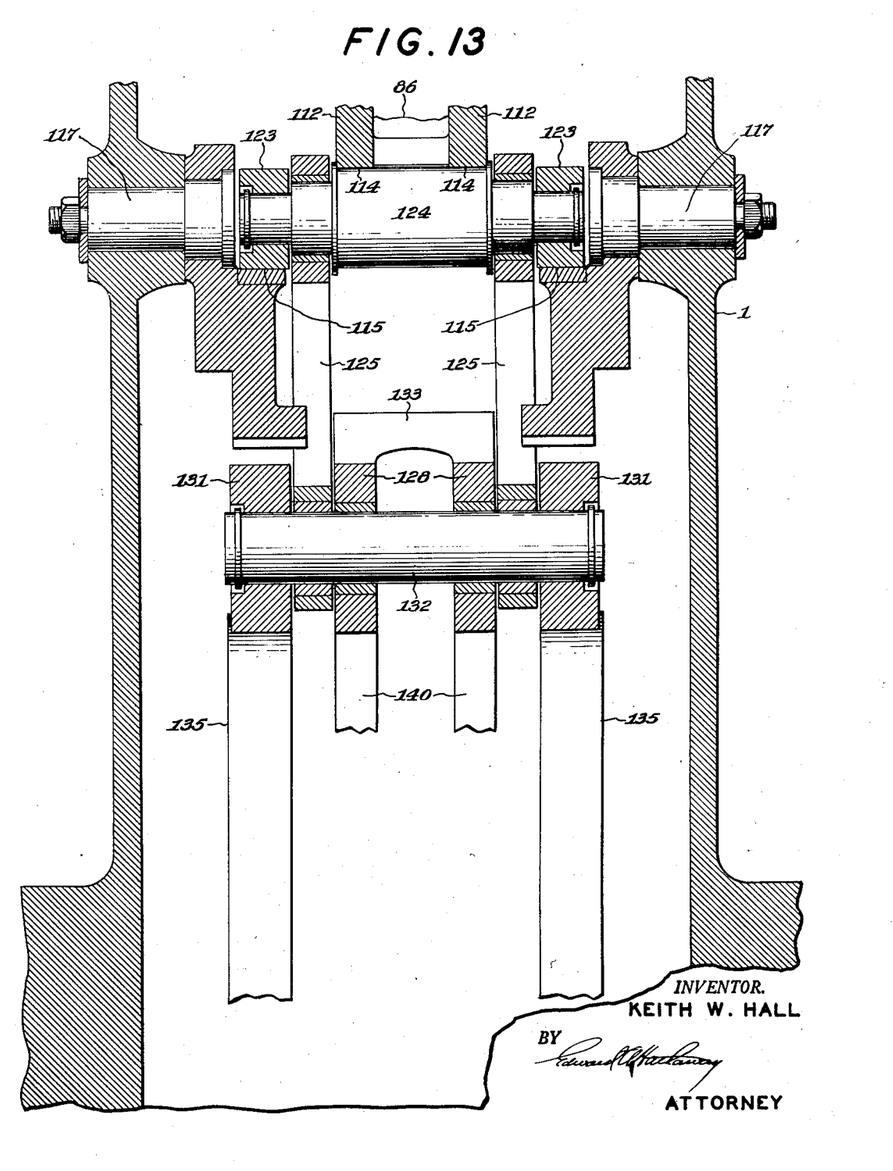
Fig. 13 is a sectional view taken substantially on line 13—13 of Fig. 2.

As shown in Fig. 2, a gear segment 116 has a linear cam surface 115 offset to one side of the inclined edge 114 but, in effect, they are functionaly opposed. Any equivalent linear cam surfaces would be functionally opposed so long as they perform action and reaction functions. The surface 115 may be angularly adjusted in a vertical plane by reason of the gear segment being horizontally journaled as shown in Fig. 13 on a stud 117 secured in the wall of the lower housing 1. Gear segment 116 can be held in any given position or adjusted to various positions by a gear segment 118 which, as shown in Fig. 4, is formed as an integral part of a sleeve 119 extending across to the corresponding segment 116 in the other quadrant. This sleeve is journaled on a shaft 120 which is supported in a suitable member bolted to the lower housing 1. A further gear segment 120', Fig. 2, is rigidly secured to the sleeve 119 at one end thereof and meshes with a worm 121. This worm is keyed to a shaft 121', Fig. 4, suitably journaled in the housing 1 and extends to the other end thereof where a second worm 121'' is attached for operating the various other similar gears in the other quadrants, the worms 121 and 121'' being right and left hand. To adjust the gears from the outside of housing 1, a pair of beveled gears 122 are provided with an operating shaft 122' extending to an external point of the housing where a hand wrench or other suitable means may be attached for adjusting purposes.

Figure 5:
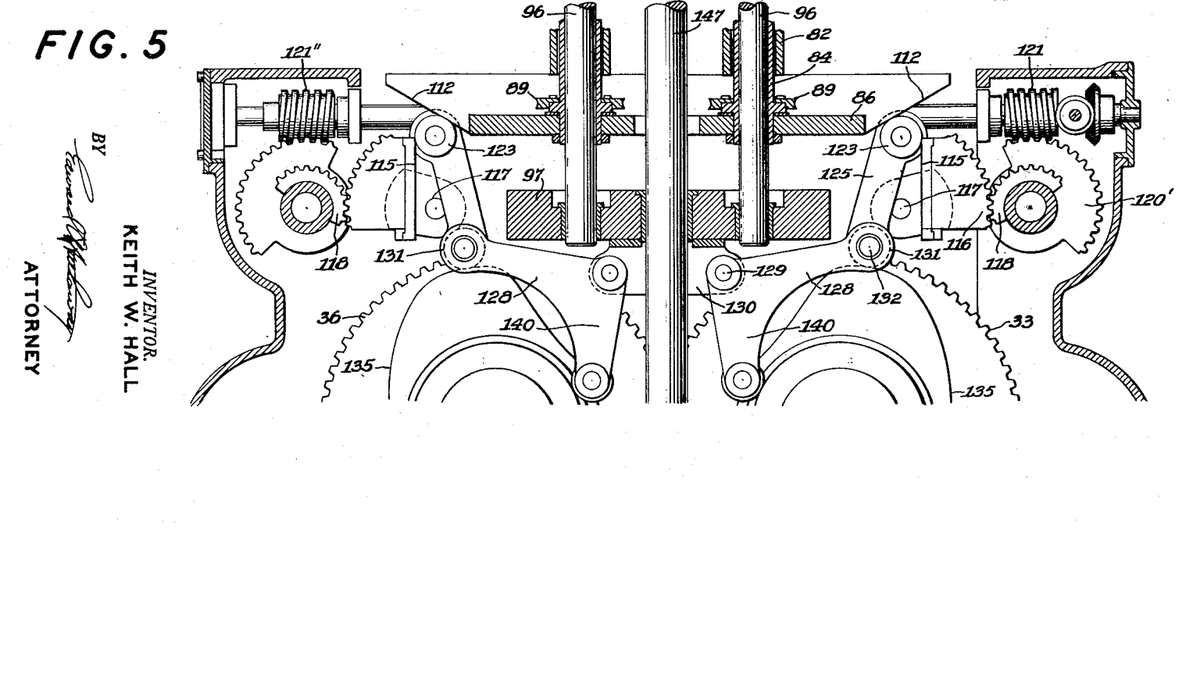
Fig. 5 is a vertical section taken generally on line 5—5 of Fig. 4 showing the ejection stroke actuating mechanism in its position for producing a maximum ejection stroke, as well as showing the mechanism for adjusting the ejection stroke.

The opposed inclined surfaces 114 and 115, Fig. 2, perform a cam function for lifting the ejection plate 86 whose stroke may be varied by adjustment of the lower inclined surface 115. The lifting operation is accomplished by the provision, Figs. 2 and 13, of a roller 123 engaging inclined surface 115 and a roller 124 engaging the inclined edge 114. The roller 124 has stud ends upon which the rollers 123 are journaled while the roller stud 124 is journaled in links 125 of adjacent quadrants, Figs. 2 and 13. The link 125 is in turn connected to one arm of a bell crank 128 whose pivot 129 is on a stationary boss 130 projecting downwardly from the cross member 97 which is a rigid part of the lower housing. A roller 131, Figs. 2 and 13, is journaled on a pin 132 which connects the lower end of said adjacent links 125 and one arm of bell crank 128. As shown in Fig. 13, the bell cranks for the adjacent quadrants at one end of the press are actually formed as a single unit connected by a cross member 133 thereby providing an extremely sturdy arrangement for supporting the rollers 131 and links 125. Each roller 131 rides upon a main ejection cam 135 which, as shown in Fig. 8, is secured to the inside of hub 136 of the main gears 33—36. Rotation of the cams 135 in the direction of the arrows thereon, Fig. 2, causes links 125 and their rollers 123 and 124 to move linearly in an upward and outward direction between the inclined cam surfaces 114, 115. So long as the surfaces 115 are adjusted to be parallel to the inclined surfaces 114 the upper free end of link 125 and their rollers will move freely along the surfaces with no movement of base plate 86. However, when cam surfaces 115 are adjusted toward the vertical in the direction of the arrow on segment 116, Fig. 2, a wedged shaped opening is formed between the two cam surfaces, as shown in Fig. 5, with the result that the cam surface 114 and ejection plate 86 will be forced upwardly, by outward movement of cam rollers 123, to an extent determined by the angle of the wedge. The cam surfaces 115 and 114 thus function as a cam means of a wedge type responsive to linear movement of the upper end of the follower means such as link 125 and the rollers thereon. In the broad aspect of these two means, one is operatively connected to the ejection punch and the other to the rotary cam means for relatively reciprocating the wedge cam and its follower to effect the ejection stroke.

*Adjustment of wedging angle.*—The pivotal supports for segments 116 are located so that their axes of rotation preferably coincide with the axes of the cam follower rollers 123 when the latter are in their lowermost position as shown in Fig. 2. With the press stopped in this position the segments 116 can be easily angularly adjusted because their surfaces 115 will simply rotate coaxially about the axes of rollers 123 without producing any force thereon. The press, if necessary, can be partially rotated until this non-actuating position of the ejection operating mechanism is reached. However, the rollers will be in this position most of the time because the largest portion of the low point of cams 135 is concentric with the cam axes.

*Return means.*—To insure return of the ejection operating link 125, the other arm 140, Fig. 2, of the bell crank is provided with a roller engageable with a return cam 141 secured, Fig. 8, to the hub 136 of the main gears. The cams 141 are also seated in annular grooves 142 formed in the crank shafts 25 and 26 thereby serving as keeper elements to hold the gears in axial position. To insure that ejection base plate 86 will return to its lower position a constant pressure piston and cylinder assembly 143, Fig. 2, has its piston rod 144 in abutment with the plate 86 to bias it downwardly thereby to supplement the action of the weight of plate 86 and associated member in returning them to their lower position. The return means could be of the usual cam groove and roller type but my bell crank arm 140 and outside cam 141 permits a larger ejection cam to be used for a given space than would be the case if a return cam were built on the outside of the ejection cam.

*Floating core rod mechanism*

Figure 14:
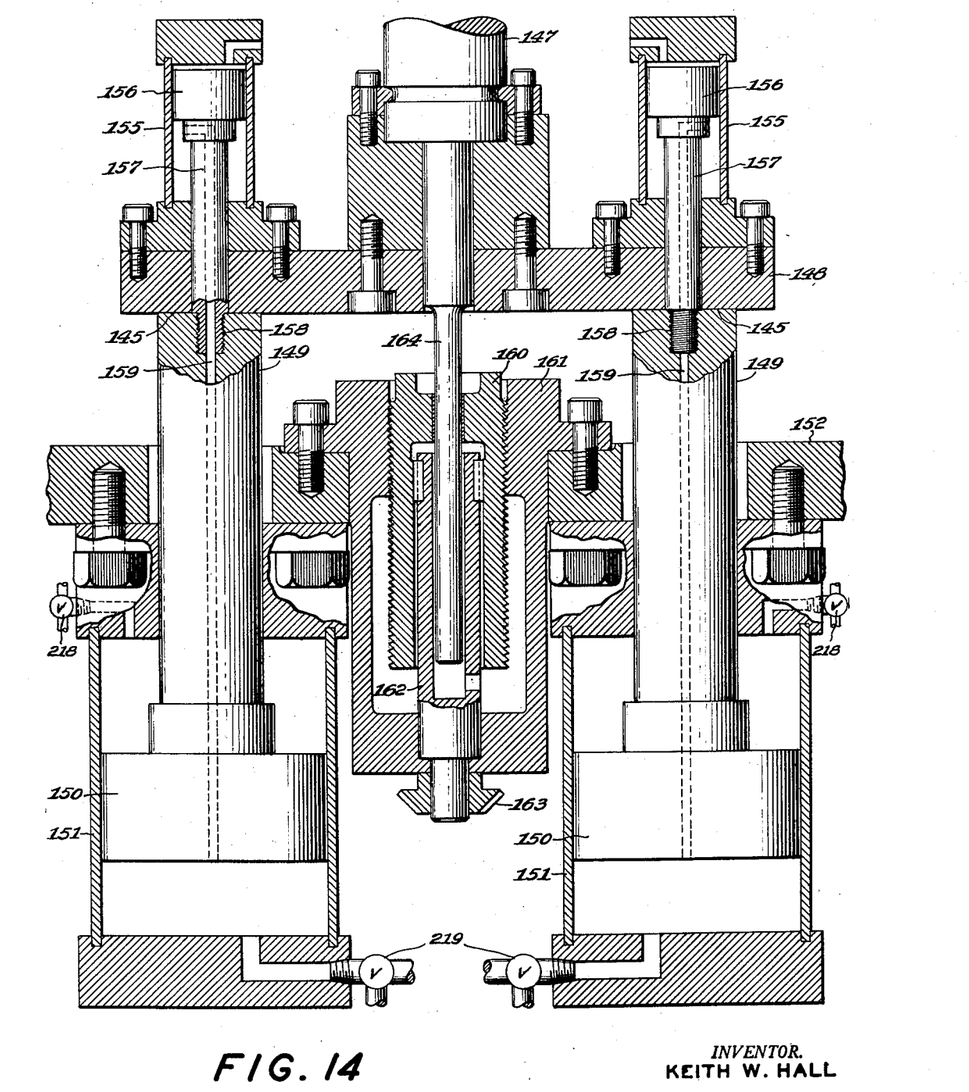
Fig. 14 is a vertical central section of the float control mechanism for the floating core rod taken partly along the line 2—2 of Fig. 8.

As shown in Fig. 2, a floating core rod 147 extends downwardly from a point within the die and is supported at its lower end, Fig. 14, upon a crosshead 148. The core rod is actually in upper and lower sections threadedly connected together at 147′, Fig. 7. The crosshead 148 is adapted to have separable abutting engagement with the upper ends 145 of piston rods 149 which have pistons 150 disposed within cylinders 151, these cylinders being supported on the underside of a stationary cross plate 152 of the lower housing. When the core rod is in its normal up position the pistons 150 are in their uppermost position against the top of cylinders 151. The lower end of the cylinders 151 are normally supplied with fluid from a suitable pressure source to bias the pistons upwardly, it being understood that this pressure may be constant or variable as circumstances may require.

The foregoing pistons permit the core rod to float downwardly against the fluid pressure in the lower ends of the cylinders, this floating action taking place when the powdered material is being compacted in the die thereby insuring more uniform density in the compact. This core rod floating action is independent of the floating action of the die and can be controlled, as shown presently, so that the core rod and die can float different distances. During subsequent upward ejection movement of the lower punch the core rod floats up with the pistons 150 until they return to their upper position in cylinders 151. At this point the compact may be only partially ejected. A reversely acting core rod float now functions to allow further core rod ejection movement.

*Core rod reverse float.*—To aid in the final ejection operation the core rod is allowed to move upwardly above the upper level of the die at the time when the compact is being ejected from the die cavity thereby permitting the compact to be stripped first from the die and thereafter to be stripped from the core rod. The ejection forces are thus not only kept to a minimum but there is a consequent reduction of possible breakage or damage to the compact. To accomplish this, Fig. 14, the crosshead 148 is provided with a pair of reverse float cylinders 155 secured to the crosshead while pistons 156 have their rods 157 threadedly secured at 158 in the piston rods 149. The friction between the core rod and compact will, upon occurrence of the ejection operation, lift the core rod and crosshead 148 upwardly away from the upper ends 145 of piston rods 149. During this upward movement pistons 156 remain stationary because the pistons 150 have reached the end of their upward stroke. Stripping of the compact off of the core rod is then against the constant pressure in the lower end of cylinders 155 which have communication with the lower end of cylinders 151 through a piston rod passage 159.

To adjust the downward limit of movement of crosshead 148 a sleeve 160 located coaxially with the core rod is vertically adjustably threaded in a stationary nut 161 which is supported on the housing cross plate 152. The sleeve 160 is rotated by an internal rod 162 slidably keyed to screw 160, the rod extending downwardly to be suitably actuated by a system of gearing 163 operable from an external point of the press. By rotatably adjusting the screw 160 its upper end may be raised or lowered to act as a stop for the crosshead 148 when in its lowermost position thereby to determine the lower limit of the core rod. A guide rod 164 has a pressed fit in crosspiece 148 and is slidably guided within the nut 160 thereby preventing the crosspiece from tilting during its vertical movement as well as guiding the threads on screw 160. A further advantage of having laterally spaced cylinders 151 with the limit stop mechanism 160, etc., located in between is that vertical space is conserved as against having a single centrally located cylinder with the limit mechanism located over it. This is important in large presses.

Feeder and pusher

Figure 10:
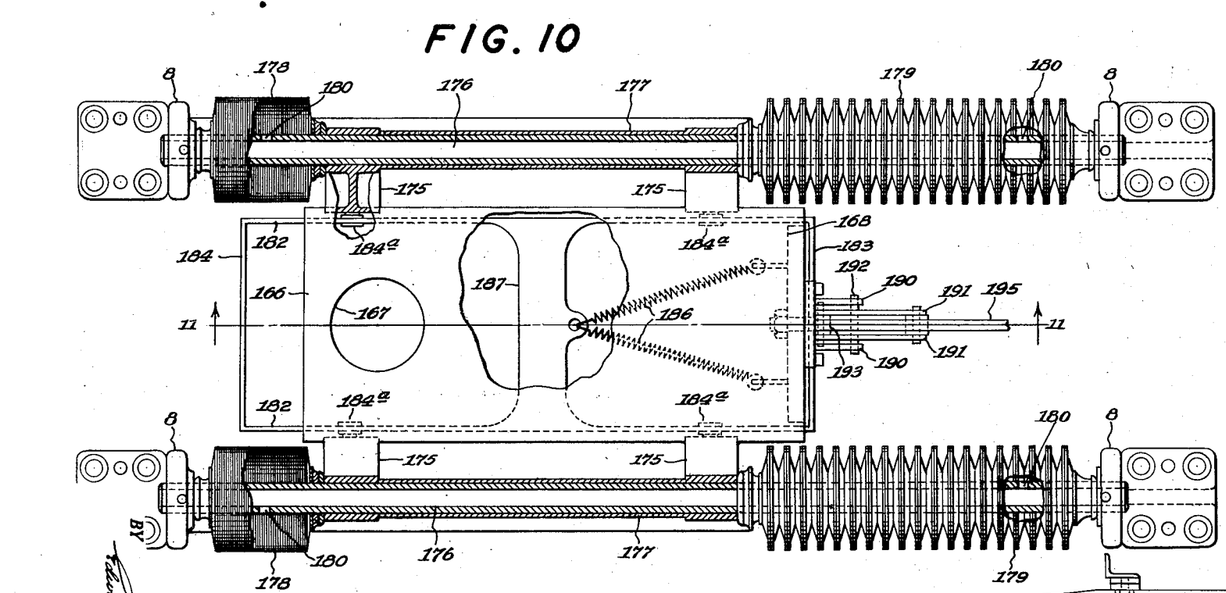
Fig. 10 is a plan view of the feeder mechanism in the area of arrow A of Fig. 2.
Figure 11:
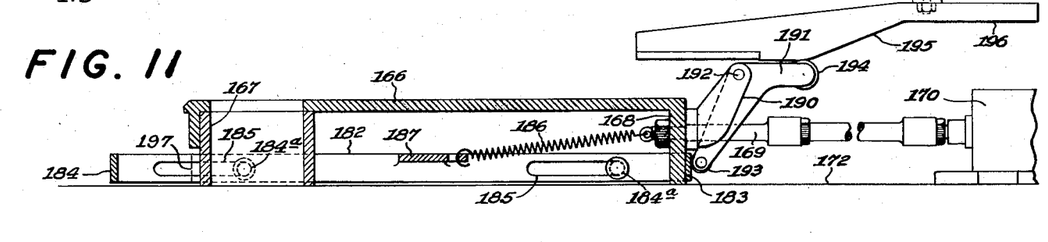
Fig. 11 is a vertical section taken substantially on line 11—11 of Fig. 10.

As generally shown in Figs. 1 and 2, there is superimposed over the die cavity a feeder shuttle generally indicated at 165. The shuttle, Figs. 10 and 11, is simply an elongated horizontal plate 166 having at its front end a ring 167 to receive material from a suitable hopper, not shown, and then transfer the material to the die cavity by sliding over the upper surface 172 of the die holder crosshead 50, Figs. 2 and 7. The rear end of the plate 166 has a bracket 168 to which an operating rod 169 is connected to be actuated by a piston and cylinder 170 or other suitable mechanism controlled in accordance with the head motion of the press. Inasmuch as the details of construction of this actuating mechanism does not constitute a part of this invention further description thereof is not necessary. The plate 166 is provided with lateral brackets 175 which are slidably supported upon stationary hollow tubes 176 one at each side of the feeder, these tubes being suitably supported at their ends on the stationary housing 8. The brackets 175 are connected by a sleeve 177 so that the intermediate portions of the tubes 176 are entirely enclosed during reciprocation of the feeder. To cover the outer ends of the tubes 176, bellows 178 and 179 are connected between the brackets 175 and the stationary points at which the tubes are connected to the housing 8. The hollow interiors of guide tubes 176 are utilized to prevent a "pumping action" by the bellows as the feeder reciprocates. To this end the tubes 176 have ports 180 communicating with the bellows at each end whereby the air in the bellows, which are being contracted during movement in one direction of the feeder, will be compressed and moved to the bellows at the other end which are undergoing expansion, and vice versa. Air is thus circulated back and forth between the bellows at opposite ends, it being understood that the tube 176 is closed at its ends so as to prevent powdered material from having access to the sliding surfaces of the tubes. The bellows thus effectively keep the tube surfaces entirely clean for guiding purposes.

In the operation of the feeder, ring 167 is retracted horizontally away from the top side of the upper end of the die so as to permit the top punch to move downwardly during its compacting stroke. After the compact is formed and then ejected it is not only necessary to refill the die but also to push the ejected piece off of the die holder to a point that is conveniently accessible for the operator to remove it. To accomplish this pushing action I have provided, Fig. 10, a horizontally extending closed loop having sides 182, an end 183 and a compact engaging end 184. This loop is supported by the feeder to reciprocate therewith and to this end rollers 184a are journaled on the brackets 175 to be received in elongated openings 185, Fig. 11, formed in the side pieces 182 of the pusher frame. These rollers are flanged so as to laterally position the pusher frame. A pair of springs 186 are suitably connected at their front ends to a crosspiece 187 extending between and connected to the sides 182 of the pusher loop while the other ends of the springs are suitably connected to the flange 168 of the feeder frame. In this manner the pusher loop is constantly biased rearwardly until stopped by the left ends of slots 185 engaging rollers 184a. As the feeder frame moves forwardly (to the left, Fig. 11) the pusher loop has additional forward movement imparted thereto in order to remove the compact, which has just been ejected, away from the die. To accomplish this two similar arms 190 are secured to the flange 168, Figs. 10 and 11, and carry a bell crank 191 pivoted at 192. One arm of the bell crank has a roller 193 engageable with the crosspiece 183 of the pusher loop while the other arm has a roller 194 engageable with a cam 195 suitably supported in a stationary position on the press frame. When the feeder frame is fully retracted, roller 194 rides upon the horizontal cam surface 196 thereby permitting the pusher end 184 to be against the outer face of filling ring 167 as shown in dotted lines at 197, Fig. 11. As the feeder frame moves forward the sloping cam portion 195 causes the bell crank to rotate in a clockwise direction and thus move the pusher loop 184 relative to the feeder frame to the position shown in Fig. 11. Upon retraction of the feeder frame, cam 195 and springs 186 will effect retraction of the pusher loop so that it does not interfere with the subsequent downward movement of the upper punch.

If the shuttle were used alone it would need a long stroke to push the articles away from the die cavity thereby incurring large inertia forces as well as increasing the possibility of powder leakage from the bottom of the shuttle ring 167, and also the shuttle cavity would have to be quite large to remain in overlapping relation to the die cavity during the filling operation. The pusher is of light weight and, therefore, its inertia forces are small and the shuttle inertia forces and size of cavity are reduced because of its shorter stroke.

*Pre-pressing die control*

As shown in Fig. 2, a cross member 200 is secured to floating head 11 by studs 201, Fig. 9. Two cylinders 202, one on each outer end of this member, contain pistons 203 whose piston rods threadedly support sleeves 204 which may be axially adjusted on the piston rods. The pistons 203 are normally biased downwardly by constant pressure fluid which may be taken from any suitable source preferably from a hydro-pneumatic accumulator 205. This accumulator pressure may be suitably adjusted in any usual and well known manner such as by bleeding off the air and adding fluid pressure thereto. The sleeves 204 are in axial alignment with and are adapted to engage the upper ends 206 of the piston rods of the die float cylinder pistons 54.

It will suffice to briefly state that this mechanism is for the purpose of adjusting flange thickness of a flanged article being formed, to press the flange and body simultaneously and to eliminate weld lines or cracks between the flange and body or to eliminate such weld lines in any area of a compressed part whose sections change, to obtain uniform density between the flange and body of the flanged part, and to obtain uniform density of straight-walled parts to a higher degree than has heretofore been possible. This is accomplished in that the mechanism moves downwardly with the upper punch head 11 during compaction of the powdered material by the upper punch 60 during which time the sleeves 204 engage the piston rod ends 206 and, as shown in Fig. 9, causes the connecting rods 52 to move the die holder 50 downwardly thus forcing it to float during the compacting action.

*Operation*

With the parts in the position shown in Fig. 2 wherein the lower punch 61 is in the lower end of the die cavity 57 and the die cavity has just been filled with powdered material from the feeder, the main gears 33 and 36, Fig. 1, rotate to move crossheads 17 and floating head 11 downwardly thereby causing upper punch 60 to enter the die cavity and compact the material therein. During this compacting action the friction between the material and die walls will cause the die to float downwardly against the constant pressure in the lower end of die float cylinders 55, Fig. 9, although if this floating action is not adequate for certain types of articles being formed then a positive downward floating of the die is accomplished by having the sleeves 204 engage the upper ends 206 of the die float piston rods thereby forcing the die downwardly as the upper punch compacts the material. For instance, if the character of the article or its material requires a compacting force which may not be sufficient to force the die to float then the die must be forcibly floated in order to get an equal distribution of density in the compact. At the same time that the die is floating, if the friction of the compacted material on the floating core rod is sufficient it will also float downwardly against the constant pressure in the lower ends of core rod float cylinders 151, Figs. 2 and 14. It will be noted that the crosshead 148 rests at this time upon the upper ends of piston rods 149 thereby to transmit a floating action to the core rod float pistons. The core rod will float downwardly until crosshead 148 engages the upper end of the adjustable threaded limit stop sleeve 160, Fig. 14. Preferably the floating action of the die is stopped simultaneously with that of the core rod by reason of the ends 63, Fig. 9, engaging the limit stop surface 64. These two limit stops for the core and die are useful in establishing flange and/or counterbore dimensions in the compact and can be readily adjusted independently of each other in the manner heretofore described to adjust such dimensions. When the crank pins have reached their lower dead center thereby completing the foregoing compacting operation they thereafter start to lift the upper punch 60 and at the same time the die and core rod start to float upwardly as the compacting force is relieved. This return floating action is effected by the constant biasing pressure in the lower ends of the core rod float cylinders 151 and in the die float cylinders 55. Simultaneously the ejection cams 135 have rotated to a position so that the rising cam surfaces 209, Fig. 2, begin to engage the rollers 131 thereby forcing links 125 and their rollers to move upwardly between the wedging surfaces 114 and 115 to force the ejection base plate 86 upwardly together with the lower punch 61 thereby to eject the compact from the die. It will be understood that the wedging surfaces as shown in Fig. 2 are in their non-actuating position. However, the degree of actuation is controlled by adjusting the wedging angle between the surfaces 114 and 115 as by changing the angularity of the lower surfaces 115. The extreme adjustment of these surfaces is shown in Fig. 5 wherein the surfaces 115 are in a vertical position thereby causing the rollers 123 to move vertically upward and thus impart maximum vertical motion to the base plate 86. Any intermediate adjustments of the surfaces 115 will cause a proportionate degree of ejection movement of the base plate. As lower punch 61 and the die holder 50 move upwardly the die holder, Fig. 9, will ultimately come to a stop against surfaces 210 at which time the lower punch 61 continues its ejection movement due to the cam action. The core rod 147 also continues to float upwardly with the article due to the constant pressure in the lower ends of cylinders 151 until the pistons 150, Figs. 2 and 14, come to a stop against the upper heads of cylinders 151. The foregoing ejection movement of pistons 150 is transmitted to the core 147 by reason of piston rods 149 abutting upwardly against the core rod crosshead 148. After the pistons 150 are stopped, as mentioned, the continuing upward ejection movement of lower punch 61 causes crosshead 148 to continue its upward movement because of friction between the core rod and compact. This friction carries the core rod and crosshead 148 upwardly away from the upper ends of piston rods 149 and against the constant pressure in the lower ends of cylinders 155 whose pistons were previously stopped. The constant pressure in the lower ends of cylinders 155 is supplied from the lower ends of cylinders 151 through the passages 159. This final upward movement of the core rod continues until the compact is fully ejected from the die at which time the compacted material slightly expands thereby releasing its frictional hold on the core rod. When this friction is released or reduced the constant pressure in the lower ends of cylinders 155 acting downwardly on crosshead 148 will move it downwardly until stopped by engaging upper end of piston rods 149 at which time the core rod will be in its normal position. Under certain circumstances the cylinders 155 need not be used in which case the upward ejection movement of the lower punch 61 simply strips the compact off of the core rod. If this mode of operation is used the piston rods 149 and core rod crosshead 148 are secured together simply by removing the cylinders 155 and their pistons whereupon bolts (not shown) are substituted for the piston rods 157 and secured in the threaded sockets in the piston rods 149. With the lower punch 61 now flush with the upper surface of the die 58 the article is removed from the press by the action of the pusher whose end 184, Fig. 11, pushes the compact off of the die in the manner heretofore described. Simultaneously the feeder ring 167 is moved completely over the die cavity at which time the lower punch 61 starts downward thereby creating a suction action on the material to draw it rapidly and fully into the die cavity. This action insures uniform distribution of the material within the die. During this operation the return cams 141, Fig. 2, engage the lower arms of bell cranks 128 thus moving the wedging rollers 123 inwardly to relieve the wedging action which thereupon permits the pistons of return cylinders 143 to act downwardly through their piston rods 144 upon the ejection base plate 86 to cause its downward movement together with lower punch 61 as heretofore described. It will be understood that when the punch 61 has reached its lowermost position the feeder is moving away from the die so that the compacting cycle can then start.

So far only the movable core rod 147 has been described although, as shown in Fig. 7, a stationary core rod 213 may be employed arranged concentrically with core rod 147. The lower end of the stationary core rod 213 is supported upon a bridge 214 which extends through a transverse slot 215 in the movable core rod 147. The bridge 214 in turn is removably secured by cap screws 217 to axial member 216 which is mounted upon the lower portion of the upper housing 2 and can be removed therefrom if necessary by screws 217'. The bridge and core rods are readily accessible for removal by laterally opening the punch holder and removing screws 217 and unscrewing the upper half of core rod 147 at threads 147' adjacent the bridge.

To make thin walled bushings the stationary core rod 213 is removed and a solid movable core rod 147 is used whose upper end is normally flush with the top of the die. This core rod and the die cavity will be of such relative diameters that the annular space between them is small enough to produce thin walled bushings. To insure filling of the very narrow space in the die under such circumstances it is desirable to pull the core rod down, preferably simultaneously with pulling the punch 61 down during the filling operation, and then moving the core rod up to its normal position. To pull the core rod down pressure fluid is admitted, Fig. 14, through a valve controlled passage 218 to the upper end of cylinders 151 and pressure from the lower end is exhausted through a valve control passage 219. After the core rod is moved to its lower position the pressures are then reversed and the upper end vented to atmosphere while the lower end is subject to constant cushioning pressure. The valves 218 and 219 are diagrammatically indicated as being of the manually operable type but obviously any well known solenoid control valves may be employed whose actuation is controlled by usual timing switches connected to the crank shafts.

From the foregoing disclosure it is seen that I have provided a press which has a great many functional and structural advantages. My particular combination of elements allows a high degree of flexibility of operation whereby new and improved results are accomplished. From a structural standpoint the elements are so cooperatively arranged that a press of high tonnage capacity may be made with a minimum weight without sacrificing any of the desired operating characteristics or flexibility of operation. My improved press is able to produce compacts of varying flange and unflanged shapes with a high degree of uniform density throughout the material of the compacts with freedom from fracture or weld areas while at the same time a high degree of flexibility is possible in adjusting the axial dimensions of the compacts as well as adjusting the floating die and core rod movements independently of each other whereby the filling position of the lower punch and its ejection stroke may be independently controlled.

It will, of course, be understood that various changes in details of construction and arrangement of parts may be made by those skilled in the art without departing from the spirit of the invention as set forth in the appended claims.

I claim:

1. A press comprising, in combination, a platen having a die, upper and lower punches receivable in the die, mechanism for effecting relative movement of said punches toward each other to compact material in the die, mechanism for moving one of the punches to eject a compacted article from the die including cam means having relatively inclined linear cam surfaces and means engageable with said surfaces for following the same, one of said cam means being operatively connected to the ejection punch to transmit an ejection stroke thereto, means for adjusting the relative inclination of said cam surfaces with respect to each other, and means for relatively reciprocating said cam and follower means so as to impart a predetermined length of ejection stroke to the ejection punch in accordance with the relative inclination of said cam surfaces.

2. The combination set forth in claim 1 further characterized in that the means for relatively reciprocating said cam and follower means includes a rotating cam and a follower which remains in contact therewith at all times so as to effect a constant length of said relative reciprocation regardless of the relative inclination of said linear cam surfaces with respect to each other and of the length of ejection stroke produced thereby.

3. The combination set forth in claim 1 further characterized by the provision of means for angularly adjusting one of said cam surfaces to vary the relative inclination between the surfaces and thereby vary the ejection stroke, said angular adjusting means being pivotally supported about an axis which extends between said cam surfaces.

4. The combination set forth in claim 1 further characterized in that the follower means includes a cam surface engaging roller, means for angularly adjusting one of said cam surfaces to vary the relative inclination between the surfaces and thereby determine the ejection stroke, and means for pivotally supporting said angularly adjustable surface about an axis which substantially coincides with the axis of said roller when the latter is in a predetermined position along the length of the cam surface with which the roller is engaged, whereby when said axes are in substantial coincidence the adjustable surface may be rotated while the roller remains in a substantially stationary position, thereby to minimize the magnitude of the necessary adjusting force.

5. The combination set forth in claim 2 further characterized by the provision of means for continuously rotating the rotatable cam in only one direction.

6. A press comprising, in combination, a die, upper and lower punches receivable in the die, means for effecting said relative vertical movement of said punches toward each other to compact material in the die, a movable ejection base plate to which one of said punches is connected, said plate having inclined cam surfaces at each end thereof, normally stationary cam surfaces functionally opposed to said other cam surfaces, follower means interposed between said opposed cam surfaces at each end of said ejection base plate, means for moving said interposed follower means linearly between said cam surfaces, and means for relatively adjusting said opposed cam surfaces so as to establish a wedging relationship between said surfaces whereby linear movement of the follower means between said surfaces causes the same to be forced apart and thereby impart ejection movement to the base plate and to the punch connected thereto.

7. A press comprising, in combination, a platen having a die, upper and lower punches receivable in the die, a crosshead for holding the lower punch, an ejection base plate, means for connecting said punch crosshead to said ejection base plate including a plurality of connecting means each of which is laterally spaced from the lower punch, a core rod for the die extending upwardly between said laterally spaced connecting means for their entire length means for adjusting the length of each of said connecting means to determine the lowermost filling position of the punch in the die, and means for reciprocating said ejection base plate.

8. The combination set forth in claim 7 further characterized in that each of said connecting means includes threadedly connected members one of which is rotatable to adjust said lowermost position of the lower punch.

9. The combination set forth in claim 7 further characterized in that each of said connecting means includes threadedly connected members one of which is rotatable to adjust said lowermost position of the lower punch; and guide rods, one for each connecting means, for laterally supporting the same.

10. A press comprising, in combination, a floating platen having a die, upper and lower punches receivable in the die, a crosshead for holding and moving said lower punch, a reciprocable ejection base member, a plurality of means connecting said ejection base member to said punch crosshead so that they reciprocate together, each of said plurality of connecting means being disposed on axes laterally of the punch; and guide rods extending through said ejection base plate, connecting means, and die platen for guiding all three of the same relative to each other.

11. The combination set forth in claim 10 further characterized in that the guide rods have upper ends extending above said die platen and lower ends extending below said ejection base member, and means for engaging said upper and lower ends of the guide rods to laterally support the same.

12. A press comprising, in combination, a platen having a die, upper and lower punches receivable in the die, means for allowing the die platen to float including a pair of die float cylinders one cylinder being located on one side of the punch axis and the other cylinder being on the other side thereof, pistons in said cylinders; crossheads one of which is connected to one of said pistons and the other is connected to the other piston, and a plurality of rods connected to each crosshead and to the die platen for supporting the latter.

13. The combination set forth in claim 12 further characterized in that said plurality of rods are provided with screw threads and limit nuts thereon, stop means engageable by said nuts to limit the downward floating action of the die platen, and means for relatively adjusting said nuts and die support rods to adjust the extent of die float movement.

14. A press comprising, in combination, a platen having a die, an upper punch movable into the die to compact material therein, a lower punch and core rod in the die, a holder having laterally separable portions for supporting said lower punch, vertical sleeves disposed laterally of the punch and extending through the punch holder to support the same, means for laterally supporting said sleeves, means for pivotally supporting the laterally movable portions of the punch crosshead upon one of said sleeves, and means for holding said separable portions together when the punch is in operation and for allowing the separable portions to be moved relative to each other to allow lateral removal of said core rod.

15. The combination set forth in claim 14 further characterized by the provision of a core rod receivable in the die, and means for supporting the core rod including means for removing the same laterally from a point below the die platen.

16. A press comprising, in combination, a platen having a die, upper and lower punches receivable in the die, means for effecting relative movement of said punches toward each other to compact material in the die, a core rod extending through the lower punch, a core rod support, float control piston and cylinder mechanism for the core rod support including two pistons and cylinders disposed along axes laterally offset from the core rod axis, and means providing an adjustable stop engageable with the core rod support to limit downward float of the core rod including relatively rotatable threaded members disposed between the pistons, and one of said threaded members being movable toward or away from the core rod support.

17. A press comprising, in combination, a platen having a die, upper and lower punches receivable in the die, means for effecting relative movement of said punches toward each other to compact material in the die, a core rod extending through the lower punch from beneath the same, a support upon which the core rod is mounted, float means for allowing the core rod to float downwardly upon compaction of material in the die around the core rod, means for imparting an upward ejection movement to the lower punch after the compact is formed during which time the core rod float means allows the core rod to move upwardly with the compact, means for stopping said upward floating action of said float means at a predetermined position, and other float means for thereafter allowing the core rod to continue its upward floating movement until the compact is fully ejected from the die.

18. The combination set forth in claim 17 further characterized in that the float means comprises a cylinder and piston having an upwardly extending piston rod adapted when the core is in said predetermined position, or in a lower position, to have abutting engagement with the core rod support, said abutting engagement being separable when the core rod returns to its predetermined position and the ejection action thereafter continues.

19. A press comprising, in combination, a platen having a die, upper and lower punches receivable in the die, mechanism for moving said upper punch inwardly of the die to compact material therein, mechanism for moving the lower punch to eject a compacted article from the die including cam means having linear cam surfaces and means engageable with said surfaces for following the same, one of said means being operatively connected to the ejection punch, means for adjusting the relative angularity of said cam surfaces with respect to each other, and means for relatively reciprocating said cam and follower means, whereby when the cam surfaces are adjusted so as to be at an angle to each other said reciprocating motion effects ejection movement of the lower punch and when said cam surfaces are adjusted to be uniformly spaced apart throughout their length then the ejection punch remains stationary even during said reciprocating movement.

20. The combination set forth in claim 19 further characterized in that the reciprocating means includes rotatable ejection and return cams having external cam surfaces, a bell crank having one arm engaging the ejection cam, an operating link connecting said arm with the following means, and the other arm of the bell crank being engageable by the return cam for returning the following means.

21. A press comprising, in combination, a platen having a die, a lower punch having a lower filling position in the die, an upper punch, means for moving said upper punch inwardly of the die to compact material therein, an ejection cam, a motion transmitting mechanism operatively connecting said cam to said lower punch for moving the latter through an ejection stroke to eject a compact from the die, means for adjusting said transmitting mechanism to vary the ejection stroke of the lower punch independently of its filling position and said mechanism remaining in constant operative connection with the cam and ejection punch for all adjustments of stroke, and means for adjusting the lowermost filling position of the ejection punch independently of its ejection stroke.

22. A press comprising, in combination, a floating platen having a die, upper and lower punches receivable in the die, float control means for the die platen, concentric stationary and movable floating core rods extending through the lower punch into the die, float control means for the floating core rod, mechanism for moving the upper punch downwardly into the die to compact material therein during which time the floating platen and floating core rod move downwardly, ejection operating means for moving said lower punch upwardly to eject a compacted article from the die and means for effecting, during such time, upward floating movement of the die platen and movable core rod.

References Cited in the file of this patent

UNITED STATES PATENTS

| | | |
|---|---|---|
| 946,583 | Simpson | Jan. 18, 1910 |
| 1,766,265 | Smith | June 24, 1930 |
| 1,974,214 | Glasner et al. | Sept. 18, 1934 |
| 2,214,505 | Magnenat | Sept. 10, 1940 |
| 2,309,828 | Dalby | Feb. 2, 1943 |
| 2,579,527 | Weyerhaeuser | Dec. 25, 1951 |
| 2,651,952 | Leavenworth | Sept. 15, 1953 |
| 2,675,584 | Feinberg et al. | Apr. 20, 1954 |
| 2,762,078 | Haller | Sept. 11, 1956 |